May 23, 1944. W. C. STARKEY Re. 22,486

REVERSING CLUTCH CONSTRUCTION FOR POWER DRIVES

Original Filed Oct. 30, 1939

INVENTOR.
WILLIAM CARLETON STARKEY.
BY Lockwood, Goldsmith & Galt.
ATTORNEYS.

Reissued May 23, 1944

Re. 22,486

UNITED STATES PATENT OFFICE 22,486

REVERSING CLUTCH CONSTRUCTION FOR POWER DRIVES

William Carleton Starkey, Indianapolis, Ind., assignor to L. G. S. Spring Clutches, Incorporated, Indianapolis, Ind., a corporation Original No. 2,214,487, dated September 10, 1940, Serial No. 301,999, October 30, 1939. Application for reissue May 19, 1941, Serial No. 394,052

24 Claims. (Cl. 192—51)

This invention relates to a reversing clutch construction for power drives.

The invention pertains particularly to the type of reversing mechanism using clutches in which a helical clutch spring is expanded or contracted to engage an internal or an external clutch surface for transmitting motion to or from the part on which said surface is formed. In constructions of this type, difficulties have been encountered in quick reversals due to the fact that the spring used for driving in one direction is not always disengaged before the spring for driving in the opposite direction becomes engaged. Thus, the mechanism attempts to drive in both directions at once and may be seriously damaged.

One object of the present invention is to overcome this difficulty by insuring that one clutching surface is disengaged before the other becomes engaged.

Another object of the invention is to provide a reversing clutch mechanism of the type described which may be compactly assembled in a small space.

Another object of the invention is to decrease the tendency toward self actuation which may be present particularly in lighter constructions of this type.

Another object of the invention is generally to improve reversing mechanisms of this type.

Figure 1:
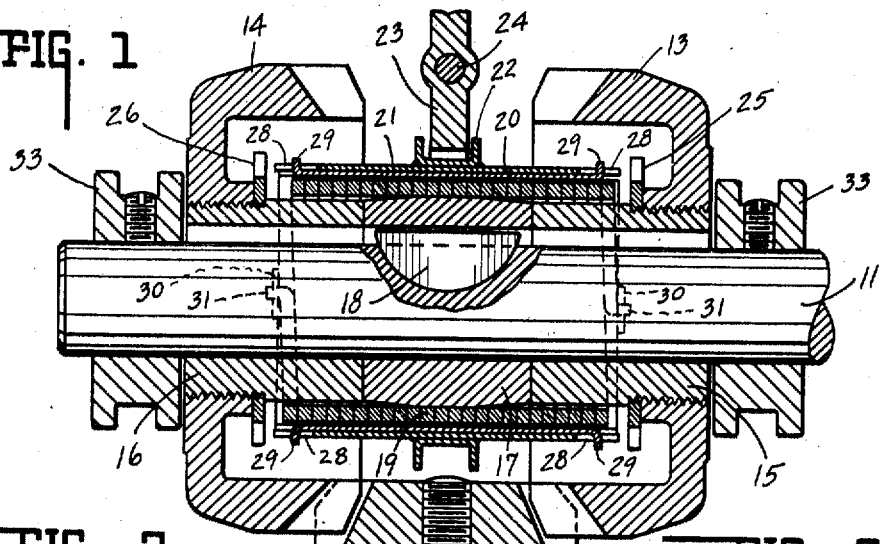
Figure 2:
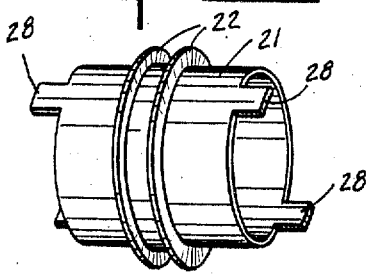
Figure 3:
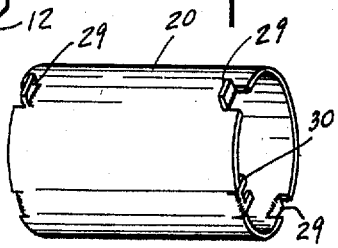
Figure 4:
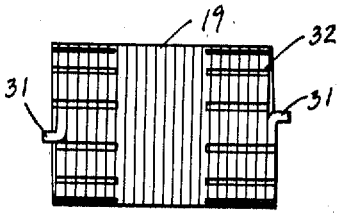
Figure 5:
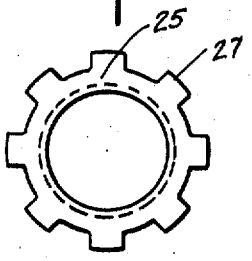
Figure 6:
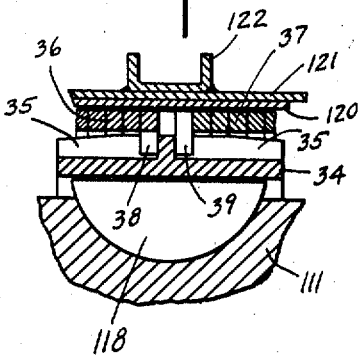

Other objects and features of the invention will be understood from the accompanying drawing and the following description and claims:

Fig. 1 is a central sectional view through a reversing mechanism constructed in accordance with the invention. Figs. 2 and 3 are perspective views of two of the members thereof. Fig. 4 is an elevational view of a preferred form of clutch spring for use with the invention. Fig. 5 is an elevational view of another member of the assembly. Fig. 6 is a fragmentary central sectional view showing an alternative form of construction.

In the preferred form of the invention shown by way of illustration, there are provided a drive shaft 10 and a shaft 11 which is to be driven selectively in either direction. The shaft 10 carries a bevel pinion 12 meshing with a pair of bevel gears 13 and 14 which are secured to driving sleeves 15 and 16 respectively. Said sleeves are freely journalled on the shaft 11. A driven collar 17 is keyed to the shaft 11 by means of a key 18. A helical clutch spring 19, the form of which is best seen in Fig. 4, has its central portion snugly engaging the collar 17 and its outer ends overhanging external clutch surfaces on the driving sleeves 15 and 16 which are of slightly smaller diameter than the internal surfaces of the spring.

A sleeve 20, best seen in Fig. 3, surrounds the spring 19 with ample clearance. A sliding actuator sleeve 21 surrounds the sleeve 20 and is provided with an exterior channel 22 cooperating with a clutch yoke 23 which is pivotally mounted on a suitably stationary support by a pin 24. Said clutch yoke, when moved on its pivotal mounting, serves to slide the actuator sleeve 21 to right or left. A pair of actuator collars 25 and 26, the form of which is best seen in Fig. 5, are secured to the sleeves 15 and 16, respectively, and held in place by the gears 13 and 14. The collars 25 and 26 have outwardly projecting teeth 27 adapted to engage lugs 28 projecting from the actuator sleeve 21. The sleeve 20 is provided with outwardly projecting lugs 29 also engageable with the lugs 28 and limiting relative rotational movement between the sleeves 20 and 21. The sleeve 20 is also provided with inwardly turned bifurcated lugs 30 adapted to engage outwardly turned toes 31 on the opposite ends of the spring 19. The spring 19 is provided with the usual shallow grooves 32 to increase the resilience of the end coils. A pair of set collars 33 are secured to the shaft 11 and maintain the gears 13 and 14 in proper position on said shaft.

In the manufacture of the device, the sleeve 20 may be formed with suitable cuts for the lugs 29 but said lugs at first are not outwardly bent. Similarly, the lugs 30 initially project longitudinally in the plane of the sleeve proper. In the assembly operation the spring 19 is placed within the sleeve 20 and the lugs 30 are then turned inwardly to straddle the toes 31. The actuator sleeve 21 is then assembled over the sleeve 20 and the lugs 29 are turned outwardly to retain the two sleeves in assembled position. It will be apparent from Fig. 1, however, that the length of sleeve 21 is such that it may have longitudinal movement relative to the sleeve 20. The two sleeves 20 and 21 together with spring 19 form a unit which may be assembled with the remaining parts on shaft 11 in an obvious manner.

In the operation of the apparatus, the parts assume the position shown in Fig. 1 when the shaft 11 is idle. With shaft 10 rotating in the direction of the arrow, the gears 13 and 14 turn freely in opposite directions and the driving sleeves 15 and 16 rotate freely within the spring 19 and out of contact therewith. Shaft 11, the spring 19 and the sleeves 20 and 21 are stationary with the sleeve 21 centered so that the lugs 28 engage neither of the actuating collars 25 nor 26. When it is desired to rotate the shaft 11 in the direction of rotation of the gear 13, the shifting fork 23 is moved to slide the actuator sleeve 21 to the right. In this movement one or both of the lugs 28 on the right end of the sleeve are engaged by the teeth 27 of the actuator 25. The sleeve 21 is rotated by this engagement until the lug 28 strikes one of the lugs 29. When this occurs, a rotational force is imparted to the sleeve 20 and to the spring 19 through the lugs 30 and the toes 31. The direction of this force is such that it tends to wrap the right end of the spring downwardly against the outer clutch surface of the driving sleeve 15. The frictional engagement of the interior clutch surface of the spring with the exterior clutch surface of the sleeve tends still further to contract the spring about the sleeve and to contract the central coils about the drive collar 17. The rotating driving sleeve 15 and the collar 17 are thus clutched together to drive the shaft 11 in the direction of rotation of the gear 13.

When it is desired to reverse the direction of rotation, the shifting fork 23 is moved in the opposite direction, bringing the lugs 28 on the left of the actuator sleeve 21 into engagement with the teeth of the collar 26. This engagement similarly exerts a contractive force on the left end of the spring 19 to clutch together the driving sleeve 16 and collar 17. Whenever a contractive force is exerted on one end of the spring 19, the lug 30 at the opposite end exerts an expanding force on the opposite end of the spring. The resulting expansion positively frees the coils from their mating clutch surface if they have been engaged therewith and moves them farther than their normal distance from said surface if they have been idle. Thus a positive release of one end of the spring is assured before the clutching action of the other end can take effect, and frequent and sudden reversals may be made without damage to the apparatus.

It will be seen from Fig. 4 that the toes 31 are not placed in the same axial line when the spring is in its free condition but are slightly overlapped. The amount of overlap is somewhat exaggerated in the drawing that it may be clearly apparent. The lugs 30 are substantially aligned so that the spring must be given a slight initial expansion in fitting the toes 31 to the lugs 30. This expansion insures that the spring is under a sufficient initial stress to eliminate lost motion between the toes 31 and lugs 30. Thus the first contracting movement of one end of the spring must always be accompanied by at least as great an expansive movement of the opposite end even though there may be a slight clearance between the toes 31 and the opposed faces of the lugs 30 engaging the same. The initial stressing of the spring is particularly important in smaller installations where a light and highly flexible spring may be used. In such installations the presence of small particles of foreign matter or congealed lubricant between the clutch surfaces of the spring and driving sleeve may create sufficient friction to actuate the spring and cause it to wrap down on the driving sleeve. The fact that the initial actuating force must be great enough to exert an expanding force on the opposite end before contracting movement can take place on the actuated end reduces greatly any tendency toward such self actuation. In larger, heavier units the initial actuating force is proportionately greater than any accidental frictional force which might be encountered and the initial stressing of the spring is not always necessary.

In Fig. 6 there is shown an alternative form of construction in which two springs are used in place of the single spring 19. In this figure, parts numbered in the one hundred series have the same construction and function as similarly numbered parts in the unit series of Fig. 1. A driven collar 34 is used similar in construction to collar 17 except that it is provided with a pair of recesses 35 on its outer surface. In place of the single spring 19, there are provided a pair of springs 36 and 37, the outer ends of which are formed in the same manner as the outer ends of spring 19 and the inner ends of which are provided with downwardly turned toes 38 and 39 resting in the recesses 35. By means of this construction the operation of the two springs is obviously the same as the operation of the spring 19 except that the inner ends are rigidly anchored to the collar 34 so that it is not necessary to rely entirely on the frictional engagement of the spring with the collar for transmission of power. In the claims the term "clutch spring unit" is intended to be generic to the two species shown in Figs. 1 and 6, the two springs of Fig. 6 being considered as parts of a single unit.

In certain cases where reversals are not made suddenly while the device is in motion, it may not be necessary to provide for expanding one end of the spring unit when the opposite end is actuated. For such cases the construction provides a simple and compact unit having definite advantages over other constructions used for the purpose. In such cases it is obviously not necessary to shape the lugs 30 to bear upon both sides of the toes 31.

Other variations in details may be made without departing from the scope of the invention as defined in the appended claims.

The invention claimed is:

1. In a reversing clutch construction, a pair of coaxially rotatable driving members each having a clutch surface concentric with the axis of rotation, power driven means adapted to rotate said driving members in opposite directions, a driven member interposed between said driving members and rotatable coaxially therewith, a helical spring clutch unit engageable with said driven member to transmit torque thereto and having portions extending freely therefrom in opposite directions and provided with clutch surfaces mating with said first mentioned clutch surfaces but normally spaced therefrom, and actuating means for said spring clutch unit adapted simultaneously to cause an expansion of one of said freely extending portions and a contraction of the other, whereby one of said portions engages its mating clutch surface to transmit torque therefrom and the other is simultaneously moved away from its mating clutch surface.

2. In a reversing clutch construction, a shaft to be driven, a pair of driving members freely journalled on said shaft, each of said members having a clutch surface concentric with said shaft, power driven means adapted to rotate said driving members in opposite directions, a driven member secured to said shaft and interposed between said driving members, a helical spring clutch unit engageable with said driven member to transmit torque thereto and having portions extending freely therefrom in opposite directions and provided with clutch surfaces mating with said first mentioned clutch surfaces but normally spaced therefrom, and actuating means for said spring clutch unit adapted simultaneously to cause an expansion of one of said freely extending portions and a contraction of the other, whereby one of said portions engages its mating clutch surface to transmit torque therefrom and the other is simultaneously moved away from its mating clutch surface.

3. In a reversing clutch construction, a pair of coaxially rotatable driving members each having an external clutch surface concentric with the axis of rotation, power driven means adapted to rotate said driving members in opposite directions, a driven member interposed between said driving members and rotatable coaxially therewith, a helical spring clutch unit engageable with said driven member to transmit torque thereto and having portions extending freely therefrom in opposite directions and provided with internal clutch surfaces mating with said first mentioned clutch surfaces but normally spaced therefrom, and actuating means for said spring clutch unit adapted simultaneously to apply an expanding force to one of said freely extending portions and a contracting force to the other, whereby the first of said portions is expanded away from its mating clutch surface and the second is contracted into clutching engagement with its mating clutch surface.

4. In a reversing clutch construction, a pair of coaxially rotatable driving members each having an external clutch surface concentric with the axis of rotation, power driven means adapted to rotate said driving members in opposite directions, a driven member interposed between said driving members and rotatable coaxially therewith, a helical member to transmit torque thereto and having portions extending freely therefrom in opposite directions and provided with internal clutch surfaces mating with said first mentioned clutch surfaces but normally spaced therefrom, an actuating member selectively movable in an axial direction to engage either of said driving members to receive a rotative force therefrom, and means connecting said actuating member and said spring clutch unit to transmit said rotative force to said unit to contract one of said freely extending portions into clutching engagement with the driving member engaged by said actuating member and to expand the other of said portions away from its mating clutch surface.

5. In a reversing clutch construction, a pair of coaxially rotatable driving members each having an external clutch surface concentric with the axis of rotation, power driven means adapted to rotate said driving members in opposite directions, a driven member interposed between said driving members and rotatable coaxially therewith, a helical spring clutch unit engageable with said driven member to transmit torque thereto and having portions extending freely therefrom in opposite directions and provided with internal clutch surfaces mating with said first mentioned clutch surfaces but normally spaced therefrom, an actuator sleeve surrounding said spring unit and axially movable to engage either of said driving members to receive a rotative force therefrom, and means connecting said actuator sleeve and said spring clutch unit to transmit said rotative force to said unit to contract one of said freely extending portions into clutching engagement with the driving member engaged by said actuator sleeve and to expand the other of said portions away from its mating clutch surface.

6. In a reversing clutch construction, a pair of coaxially rotatable driving members each having an external cylindrical clutch surface concentric with the axis of rotation, power driven means adapted to rotate said driving members in opposite directions, a driven member interposed between said driving members and rotatable coaxially therewith, a helical spring clutch unit engageable with said driven member to transmit torque thereto and having portions extending freely therefrom in opposite directions and provided with internal clutch surfaces mating with said first mentioned clutch surfaces but normally spaced therefrom, an axially movable actuator sleeve surrounding said spring unit, said sleeve having projections engageable with portions of either of said driving members to receive a rotative force therefrom, and means connecting said actuator sleeve and said spring clutch unit to transmit said rotative force to said unit to contract one of said freely extending portions into clutching engagement with the driving member engaged by said actuator sleeve and to expand the other of said portions away from its mating clutch surface.

7. In a reversing clutch construction, a pair of coaxially rotatable driving members each having a clutch surface concentric with the axis of rotation, power driven means adapted to rotate said driving members in opposite directions, a driven member interposed between said driving members and rotatable coaxially therewith, a helical spring clutch unit engageable with said driven member to transmit torque thereto and having portions extending freely therefrom in opposite directions and provided with clutch surfaces mating with said first mentioned clutch surfaces but normally spaced therefrom, a spring operating member engaging both free ends of said spring unit and movable relative thereto to cause a simultaneous expansion of one end and a contraction of the other, said operating member normally holding said spring under an initial stress tending to prevent lost motion therebetween, and actuating means for so moving said operating member, whereby one end of said spring unit engages its mating clutch surface to transmit torque therefrom and the other is simultaneously moved away from its mating clutch surface.

8. In a reversing clutch construction, a pair of coaxially rotatable driving members each having an external clutch surface concentric with the axis of rotation, power driven means adapted to rotate said driving members in opposite directions, a driven member interposed between said driving members and rotatable coaxially therewith, a helical spring clutch unit engageable with said driven member to transmit torque thereto and having portions extending freely therefrom in opposite directions and provided with internal clutch surfaces mating with said first mentioned clutch surfaces but normally spaced therefrom, a spring operating member engaging both free ends of said spring unit and movable relative thereto to cause a simultaneous expansion of one end and a contraction of the other, said operating member normally holding said spring under an initial stress tending to prevent lost motion therebetween, and actuating means for so moving said operating member whereby the first of said ends is expanded away from its mating clutch surface and the second is contracted into clutching engagement with its mating clutch surface.

9. In a reversing clutch construction, a pair of coaxially rotatable driving members each having an external clutch surface concentric with the axis of rotation, power driven means adapted to rotate said driving members in opposite directions, a driven member interposed between said driving members and rotatable coaxially therewith, a helical spring clutch unit engageable with said driven member to transmit torque thereto and having portions extending freely therefrom in opposite directions and provided with internal clutch surfaces mating with said first mentioned clutch surfaces but normally spaced therefrom, a spring operating sleeve surrounding said spring unit and engaging the opposite free ends thereof, said sleeve being movable relative to said spring unit to cause simultaneous expansion of one end and contraction of the other and normally holding said spring under an initial stress preventing lost motion therebetween, and an actuator sleeve surrounding said operating sleeve and constrained against rotative movement relative thereto but axially movable to engage either of said driving members to receive a rotative force therefrom, said force being transmitted to said operating sleeve and thence to said spring unit, whereby one end of said unit is contracted into clutching engagement with the driving member engaged by said actuator sleeve and the other is expanded away from its mating clutch surface.

10. A reversing clutch mechanism including a source of power, a driven element, reverse driving gears associated with the driven element for transmitting reverse driving effects to the latter, a clutch spring unit intermediate said driving gears and operatively connected with the driven element comprising a spring-confining member and a shifter element coaxially arranged about the spring unit in the sequence named, said member and element adapted to be inter-engaged with each other and operatively connected to either driving gear to be actuated thereby and coacting with the clutch spring unit when actuated by a driving gear to cause driving engagement of the clutch spring unit with the driving gear.

11. A reversing clutch mechanism including a source of power, a driven element, reverse driving gears for transmitting reverse driving effects to the driven element, means for connecting either driving gear to the driven element comprising a clutch spring unit and a clutch spring unit confining member, inter-engaging means on said spring unit and member to prevent relative axial movement therebetween and means to establish a driving relation between a reverse driving gear and said driven element through said spring unit and member.

12. A reversing clutch mechanism including a source of power, a driven element, reverse driving gears associated with the driven element for transmitting reverse driving effects to the latter, a clutch spring unit intermediate said driving gears and operatively connected with the driven element, means for connecting either driving gear to its cooperating clutch spring unit comprising a spring-enclosing member mounted about the spring unit having inwardly extending portions to engage and confine the opposite ends of the spring unit and limit relative axial movement between the spring unit and member, said member being adapted to be inter-engaged with either driving gear to be actuated thereby and coact with the clutch spring unit when actuated by said driving gear to cause driving engagement of the clutch spring unit with the driving gear.

13. A reversing clutch mechanism including a source of power, a driven element, reversing driving gears associated with the driven element for transmitting reverse driving effects to the latter, a clutch spring unit intermediate said driving gears and operatively connected with the driven element comprising a spring unit confining sleeve and a shifter element coaxially arranged about the spring unit in the sequence named, said sleeve and element non-rotatably inter-engaged with each other and adapted to be operatively connected to either driving gear to be actuated thereby, said sleeve coacting with said clutch spring unit when connected to a driving gear to cause engagement of the clutch spring unit therewith.

14. A reversing clutch mechanism including a source of power, a driven element, reverse driving gears for transmitting reverse driving effects to the driven element, means for connecting either driving gear to the driven element comprising a clutch spring unit and a clutch spring unit confining member, inter-engaging means on said spring unit and member to prevent relative axial movement therebetween and manually-controlled means inter-engageable with a driving gear and said member to establish a clutched driving relation between coaxial portions of a reverse driving gear and said driven element through said spring unit.

15. A spring clutch comprising a driving and driven element, coaxial, cylindrical surfaces on said elements, a coil spring unit operatively secured to one of said elements, means on the other of said elements to operatably engage one of the free ends of the spring unit to flex the same into clutching engagement with said coaxial surfaces, and a sleeve extending axially of the spring unit provided with overhanging end portions arranged to engage the free end convolutions of the spring unit and limit the relative longitudinal movement therebetween.

16. A spring clutch comprising driving and driven elements, axially-aligned, cylindrical surfaces on said elements, a coil spring unit operatively secured to said driven element and proportioned to freely surround both of said cylindrical surfaces, a sleeve surrounding said coil spring unit having inwardly extending portions thereon arranged to engage the free ends of the coil spring unit to limit the relative movement therebetween.

17. A spring clutch comprising a pair of reverse driving elements and a driven element, coaxial cylindrical surfaces on said elements, a coil spring unit operatively secured to one of said elements, means on the other of said elements to operatively engage the free ends of the spring to flex the same into clutching engagement with its coaxial surface comprising a sleeve mounted axially on the spring unit to rotate therewith and provided with overhanging end portions arranged to engage the free end convolutions of the spring unit and limit the longitudinal movement therebetween.

18. A spring clutch comprising a pair of reverse driving gears and a driven element, axially-aligned, cylindrical surfaces on said gears and element, a coil spring unit operatively anchored to said driven element and proportioned to surround a cylindrical surface on one of said gears, and a sleeve surrounding said coil spring unit having inwardly extending portions thereon to engage the free end of the coil spring unit to limit the relative movement therebetween.

19. In a reversing clutch construction, a pair of coaxially rotatable driving members each having an external cylindrical clutch surface concentric with the axis of rotation, power driven means adapted to rotate said driving members in opposite directions, a driven member interposed between said driving members and rotatable coaxially therewith, a helical spring clutch unit engageable with said driven member to transmit torque thereto and having portions extending freely therefrom in opposite directions and provided with internal clutch surfaces mating with said first mentioned clutch surfaces but normally spaced therefrom, an actuating member selectively movable in an axial direction to engage either of said driving members to receive a rotative force therefrom, a sleeve surrounding said spring clutch unit and rotatable coaxially therewith, and radially extending projections on each end of said sleeve positioned for operative engagement with said actuating member and to transmit said rotative force to said unit to contract one of said freely extending portions into clutching engagement with the driving member engaged by said actuating member.

20. In a reversing clutch construction, a pair of coaxially rotatable driving members each having a clutch surface concentric with the axis of rotation, power driven means adapted to rotate said driving members in opposite directions, a driven member interposed between said driving members and rotatable coaxially therewith, a helical spring clutch unit engageable with said driven member to transmit torque thereto and having portions extending freely therefrom in opposite directions and provided with clutch surfaces mating with said first mentioned clutch surfaces but normally spaced therefrom, said spring clutch unit terminating at each end thereof with a projection, a sleeve surrounding said unit and rotatable coaxially thereof, an actuator member associated with said sleeve movable to transmit rotative force between said sleeve and one or the other of said driving members, and a pair of spaced lugs on each end of said sleeve extending into embracing relation with said spring unit projections respectively adapted to simultaneously and positively cause an expansion of one of said freely extending portions and a contraction of the other, whereby one of said portions engages its mating clutch surface to transmit torque therefrom and the other is simultaneously moved away from its mating clutch surface.

21. In a reversing clutch construction, a pair of coaxially rotatable driving members each having an external clutch surface concentric with the axis of rotation, power driven means adapted to rotate said driving members in opposite directions, a driven member interposed between said driving members and rotatable coaxially therewith, a helical spring clutch unit engageable with said driven member to transmit torque thereto and having portions extending freely therefrom in opposite directions and provided with internal clutch surfaces mating with said first mentioned clutch surfaces but normally spaced therefrom, said unit being provided with outwardly and longitudinally extending toes, a spring operating sleeve surrounding said spring unit and having inwardly extending lugs at each end thereof interlocking with said toes respectively to cause simultaneous and positive expansion of one end of said unit and contraction of the other into clutching engagement with the driving member, an actuator sleeve surrounding said spring operating sleeve and axially movable to be engaged by either of said driving members to receive a rotative force therefrom, and interengaging projections on said sleeves to transmit rotative movement therebetween.

22. In a reversing clutch construction, a pair of coaxially rotatable driving members each having an external cylindrical clutch surface concentric with the axis of rotation, power driven means adapted to rotate said driving members in opposite directions, a driven member interposed between said driving members and rotatable coaxially therewith, a helical spring clutch unit engageable with said driven member to transmit torque thereto and having portions extending freely therefrom in opposite directions and provided with internal clutch surfaces mating with said first-mentioned clutch surfaces but normally spaced therefrom, an actuating member selectively movable in an axial direction to engage either of said driving members to receive a rotative force therefrom, a sleeve surrounding said spring clutch unit and spaced in confining relation thereto for limiting radial expansion thereof, and means provided at each end of said sleeve positioned for operative interengagement between said actuating member and unit for transmiting rotative force between one of said driving members and the associated portion of said unit to effect contraction thereof into clutching engagement, certain of said inter-engaging means on said sleeve acting to embrace the opposite ends of said unit for longitudinally confining the same.

23. In a reversing clutch construction, a pair of coaxially rotatable driving members, each having an external cylindrical clutch surface concentric with the axis of rotation, power driven means adapted to rotate said driving members in opposite directions, a driven member interposed between said driving members and rotatable coaxially therewith, a helical spring clutch unit engageable with said driven member to transmit torque thereto and having portions extending freely therefrom in opposite directions and provided with internal clutch surfaces mating with said first-mentioned clutch surfaces but normally spaced therefrom, an actuating member selectively movable in an axial direction, projections extending outwardly from the opposite ends of said member adjacent the periphery thereof for engagement with either of said driving members to receive a rotative force therefrom, a sleeve surrounding said spring clutch unit and spaced in confining relation thereto, outwardly extending lugs on each end thereof formed in continuation with its peripheral surface adapted to be bent upwardly into position for inter-engagement with the projections on said actuating member for transmitting rotative force between said member and sleeve, and correspondingly formed lugs thereon adapted to be bent downwardly in embracing relation with the opposite ends of said spring clutch unit, said spring clutch unit being provided with outwardly extending toes on the free ends thereof inter-engaging said last-mentioned lugs for receiving said transmitted rotative force to effect contraction thereof into clutching engagement with said driving members respectively.

24. A spring clutch comprising driving and driven elements, said elements being axially aligned, one of said elements having a cylindrical surface, a coil spring unit operably secured to one of said elements and proportioned to freely surround the cylindrical surface of the other of said elements for clutching engagement therewith when rotated to effect contraction thereof, said coil spring unit being formed with an outwardly-extending toe on one end thereof in parallel relation with its axis, a sleeve surrounding said coil spring unit having a projection formed on the end thereof adapted to be turned upwardly for rotative engagement by said driving element, and a second projection extending from the end thereof adapted to be turned inwardly in inter-engagement with the outwardly-extending toe on said unit for transmitting rotative force thereto and thereby causing a winding action into said clutching engagement, the projections on said sleeve being integral continuations of the peripheral surface thereof.

WILLIAM CARLETON STARKEY.